United States Patent Office 3,036,012
Patented May 22, 1962

3,036,012
PHOSPHONATE ESTER HYDRAULIC FLUID
Douglas H. Moreton, Pacific Palisades, Calif., assignor to Douglas Aircraft Company, Inc., Santa Monica, Calif.
No Drawing. Filed Oct. 22, 1952, Ser. No. 316,325
5 Claims. (Cl. 252—78)

This invention relates to a fluid composition useful particularly for transmitting power in hydraulic power systems and especially as a non-flammable hydraulic fluid in the hydraulic systems of aircraft and to a method of transmitting power in and of lubricating the parts of a hydraulic system.

A number of fluids are known which are intended for use to transmit power in hydraulic systems including some known fluids intended for use in the hydraulic systems of airplanes. However, the hydraulic power systems of aircraft for operating various mechanisms of an airplane impose stringent requirements on the hydraulic fluid used. Not only must the hydraulic fluid for aircraft meet stringent functional and use requirements but in addition such fluid should be as highly non-flammable as possible and must be sufficiently non-flammable to satisfy aircraft requirements for fire resistance. The viscosity characteristics of the fluid must be such that it may be used over a wide temperature range; that is, adequately high viscosity at high temperature, low viscosity at low temperature and a low rate of change of viscosity with temperature. Its pour point should be low. Its volatility should be low at elevated temperatures of use and the volatility should be balanced; that is, selective evaporation or volatilization of any important component should not take place at the high temperatures of use. It must possess sufficient lubricity and mechanical stability to enable it to be used in the self-lubricated pumps, valves, et cetera employed in the hydraulic systems of aircraft which are exceedingly severe on the fluid used. It should be chemically stable to resist such chemical reactions as oxidation, decomposition, et cetera so that it will remain stable under conditions of use against loss of desired characteristics due to high and sudden changes of pressure, temperature, high shearing stresses, and contact with various metals which may be, for example, aluminum, bronze, steel, et cetera. It should also not deteriorate the gaskets or packings of the hydraulic system. It must not adversely affect the materials of which the system is constructed, and in the event of a leak should not adversely affect the various parts of the airplane with which it may accidentally come in contact. It should not be toxic or harmful to personnel who may come in contact with it. Furthermore, in addition to all such requisites for aircraft use, the fluid must be sufficiently non-flammable to meet aircraft requirements.

Numerous hydraulic fluid mixtures have been suggested. Light petroleum oil fractions to which suitable pour point depressants, viscosity index improvers, inhibitors, et cetera have been added are among the best so far proposed and these have been used somewhat extensively as aircraft hydraulic fluids. These materials, however, are too readily flammable, have a low autogenous ignition temperature, burn readily once ignited and have a high heat value. These characteristics are particularly undesirable in aircraft where necessity dictates the use of hydraulic lines in close proximity to electrical systems and to engines where a leakage of hydraulic fluid at high pressure through a crash of the airplane or failure of the hydraulic system while in flight may result in fire. None of these prior materials will meet the requirements of an aircraft hydraulic fluid and at the same time be sufficiently non-flammable to meet this exceedingly important requirement for aircraft use.

In many hydraulic systems power must be transmitted and the frictional parts of the system lubricated by the hydraulic fluid used. The parts which are so lubricated include the frictional surfaces of the source of power, which is usually a pump, valves, operating pistons and cylinders, and fluid motors. The hydraulic system may be of either the constant-volume or the variable-volume type of system.

The pumps may be of various types, including the piston-type pump, more particularly the variable-stroke piston pump, the variable-discharge or variable-displacement piston pump, radial-piston pump, axial-piston pump, in which a pivoted cylinder block is adjusted at various angles with the piston assembly, for example, the Vickers axial-piston pump, or in which the mechanism which drives the pistons is set at an angle adjustable with the cylinder block; gear-type pump, which may be spur, helical or herringbone gears, variations of internal gears, or a screw pump, or vane pumps. The valves may be stop valves, reversing valves, pilot valves, throttling valves, sequence valves or relief valves. Fluid motors are usually constant-or variable-discharge piston pumps caused to rotate by the pressure of the hydraulic fluid of the system with the power supplied by the pump power source. Such a hydraulic motor may be used in connection with a variable-discharge pump to form a variable-speed transmission.

Accordingly, a large number of requirements are placed on the method of performing these functions of transmitting power in and lubricating the frictional parts of such hydraulic systems, depending upon the particular hydraulic system and its particular use. Among the stringent requirements of the method of transmitting power in and lubricating the parts of such a system are that it must be done by means of a fluid having satisfactory properties such as low viscosity at low temperatures of use, high viscosity at high temperatures of use, low rate of change of viscosity with temperature over the temperature range of use, particularly high voscosity index, lubricating properties, density, chemical stability, resistance to oxidation, resistance to emulsification, resistance to the formation of gum or sludge.

Good lubricating properties are especially important. These particularly include lubricity and film strength. Good lubricity and film strength lessen wear of moving parts in pumps and valves where the clearance between frictional surfaces may be so small that only microscopically thin films of lubricant are possible. Pressures between some of the moving parts may be very high. To avoid excessive wear or seizure, especially in the case of high fluid pressure, the hydraulic fluid should provide a strong lubricating film which will resist the pressure and wiping action between the moving parts at the temperatures of operation. Wear of the parts of a hydraulic system allows internal leakage and excessive frictional heat. Load-carrying capacity or lubricity is also important in some hydraulic systems. Wear at the glands and sealing elements of the hydraulic system is undesirable because it leads to external leakage of the fluid. Accordingly, it is desirable that the hydraulic fluid also lubricate the areas of contact with the sealing means. The situation with respect to such hydraulic systems to which my invention relates is in general known to the art and is generally described in the trade publication, entitled "Hydraulic Systems Circulating Oils for Ma-Socony-Vacuum Oil Company, Inc., 26 Broadway, New York, N. Y. Patent 2,355,357 to H. W. Adams et al., issued August 8, 1944, discloses a hydraulic system for airplanes which is also illustrative of a type of hydraulic system to which my invention relates. DC4 Maintenance Manual, volume III, section 1, Hydraulics, Douglas Service, April 1947, pages 10 and 11, and February 1948, pages 10 and 11, all published by Douglas Aircraft Company, Inc., Santa Monica, California, also disclose hydraulic systems for airplanes which are illustrative of the type of hydraulic system to which my invention relates. Also, the cabin supercharger drive system of the DC-6 airplane, described in "Douglas Service," February 1948, published by Douglas Aircraft Company, Inc.

The requirements for the hydraulic system of an airplane are particularly severe. These include a good lubricity to effectively lubricate the moving parts of the system, satisfactory viscosity at low as well as high temperatures at which the aircraft may have to operate, low rate of change of viscosity with temperature, particularly high viscosity index, stability under conditions of use against loss of the desired characteristics due to high and sudden changes of pressure, temperature, high shearing stresses, non-corrosiveness to metal parts which may be bronze, aluminum, steel et cetera, and the property of not deteriorating gaskets or packings, and in addition to all such requirements for aircraft use, the fluid must also be highly non-flammable or fire-resistant. The parts of the hydraulic system of aircraft are required to be as light in weight as possible and this factor results in imposing additional severe lubrication requirements and usually higher fluid temperatures.

Among the particular frictional surfaces which must be lubricated are hard steel on hard steel, particularly ball bearings and gear teeth, hard steel on cast iron, particularly sliding friction between such surfaces, hard steel on bronze or alloy bronze, such as between the steel piston and bronze cylinder of a Vickers pump, and metal in contact with elastomer seals, particularly steel or bronze on neoprene, Buna N, butyl rubber, silastic rubber, and natural rubber. The hard steel may be chrome plated.

In accordance with this invention, the discovery has been made that hydraulic fluids surprisingly satisfactory for aircraft hydraulic systems can be made by compounding a relatively major proportion of dibutyl phenyl phosphonate with a relatively minor proportion of an agent effective to increase the viscosity index and viscosity at elevated temperatures of the dibutyl phenyl phosphonate, particularly a polymerized alkyl methacrylate (poly alkyl methacrylate).

It is an especially significant feature of the compositions of my invention that in addition to having a large number of properties making them suitable for the purposes as indicated above, these compositions of my invention have a very surprising combination of high fire-resistance or non-flammability and low viscosity at extremely low temperatures, such as −40° F., together with an adequately high viscosity at such operating temperatures as 100° F. and 210° F. Moreover, the resulting viscosity index is unexpectedly high. All these striking factors must be taken in consideration with the fact that the compositions are homogenous; that is, the components in accordance with my invention are surprisingly and unexpectedly compatible.

The poly alkyl methacrylates especially suitable for the purpose of this invention are in general those resulting from the polymerization of alkyl methacrylates in which the alkyl groups have from 2 to 6 carbon atoms. The alkyl groups may be mixtures such as derived from a mixture of alcohols, and in which case there may be included some alkyl groups having as low as 2 carbon atoms and as high as about 8 or 10 carbon atoms, but the mixture should predominate in alkyl groups having from 2 to 6 carbon atoms. The number of carbon atoms in the alkyl group should be such that the polymer is compatible with the particular phosphonate used and for dibutyl phenyl phosphonate the alkyl group should have from 2 to 6 carbon atoms as pointed out above. Thus, the poly alkyl methacrylate may be poly ethyl, poly propyl, poly butyl, poly amyl, or poly hexyl methacrylate. The alkyl groups may be branched chain or preferably normal alkyl groups. The molecular size of the polymerized alkyl methacrylate should be great enough to increase the viscosity of the dibutyl phenyl phosphonate to which added and small enough to be compatible therewith as is generally understood with regard to improvement in viscosity index. In general the average molecular weight should be within 2,000 to 12,000 and the molecular weight range from about 1,500 to 14,000. The poly alkyl methacrylate should be such and in sufficient proportion to increase the viscosity at elevated temperatures, for example, at 210° F. to at least about 3.0 centistokes, and to increase the viscosity index, for example, to above 100, and preferably to above 150.

In compounding the compositions of this invention, the alkyl methacrylate polymer may be added to the phosphonate or mixture of phosphonates, or the monomer may be polymerized in situ in the phosphonate or mixture of phosphonates by adding the unpolymerized alkyl methacrylate ester thereto and then polymerizing the monomer to the desired degree.

Usually a minor proportion and particularly from 0.2 to 10 percent by weight of the poly alkyl methacrylate (exclusive of any solvent) will be found satisfactory, and preferably a proportion within the range from 2 to 6 percent. This percentage of poly alkyl methacrylate is based on the sum of the phosphonate and polymer as being 100 percent.

The following examples will further illustrate my invention:

*Example 1*

About 3 percent by weight of a poly butyl methacrylate having an average molecular weight of about 6,000 and a range of about 2,000 to 14,000 was dissolved in about 97 percent by weight of dibutyl phenyl phosphonate at room temperature. The combination of properties of this composition is surprising and this fluid is especially satisfactory as a fire-resistant hydraulic fluid for aircraft. It is especially unexpected that this particular poly butyl methacrylate was compatible through a wide temperature range and so effective to increase the viscosity index to a high value and thicken, that is, for example, increase the viscosity at such elevated temperature as 210° F.

*Example 2*

About 4.5 percent by weight of a poly hexyl methacrylate having an average molecular weight of about 6,500 and a range of about 2,000 to 14,000 was dissolved in about 95.5 percent by weight of dibutyl phenyl phosphonate at room temperature. The combination of properties of this composition is surprising and this fluid is especially satisfactory as a fire-resistant hydraulic fluid for aircraft. It is especially unexpected that this particular poly hexyl methacrylate was compatible through a wide temperature range and so effective to increase the viscosity index to a high value and thicken, that is, for example, increase the viscosity at such elevated temperature as 210° F.

In accordance with my invention it is possible to make compositions having a surprising combination of properties particularly including a fire resistance as indicated by an autogenous ignition temperature above 1000° F., a viscosity at 210° F. above 3.0 centistokes and a low viscosity at −40° F., for example, for relatively small proportions of the poly alkyl methacrylate a viscosity at −40° F. below 1000 may be obtained providing a useful composition throughout an exceedingly wide temperature range. Moreover, in addition to this specified combination of properties the fluids in accordance with my invention are otherwise satisfactory as fire-resistant hydraulic fluids for aircraft as pointed out above.

These compositions of my invention are surprisingly satisfactory for transmitting power in and lubricating the parts of an airplane hydraulic system having a Vickers axial-piston pump as the power source. In addition, the compositions also have a high degree of non-flammability or fire-resistance making them eminently suitable as hydraulic fluids for airplanes. These compositions are especially suitable as lubricants for the frictional surfaces, particularly the combination of such surfaces, of the hydraulic system. These particularly include the lubrication of the metal-on-metal and metal-on-elastomer surfaces referred to hereinabove. This lubrication is effected by maintaining a film of the composition between the frictional surfaces. It is especially surprising that both functions of transmitting power and lubrication can be so satisfactorily performed by the compositions of this invention while at the same time such compositions are eminently satisfactory in other respects for aircraft use.

The foregoing describes my invention in its preferred aspects, and illustrates my invention by way of specific examples, but alterations and modifications may be made thereof without departing from the invention herein disclosed. It will be understood that additives such as antioxidants, corrosion inhibitors etc. may be added, if desired, without departing from my invention as disclosed and claimed.

Having described my invention I claim:

1. The composition consisting essentially of dibutyl phenyl phosphonate and a sufficient proportion of a poly alkyl methacrylate the alkyl groups of which have from 4 to 6 carbon atoms and said poly alkyl methacrylate has an average molecular weight within the range of 2,000 to 12,000 and a molecular weight range of 1,500 to 14,000 to increase the viscosity of the composition at 210° F. above 3.0 centistokes and to increase the viscosity index of the composition above 150, said composition having a viscosity at −40° F. below 1000 centistokes.

2. The composition as defined in claim 1 in which said poly alkyl methacrylate is poly butyl methacrylate.

3. The composition as defined in claim 1 in which said poly alkyl methacrylate is poly amyl methacrylate.

4. The composition as defined in claim 1 in which said poly alkyl methacrylate is poly hexyl methacrylate.

5. The composition as defined in claim 1 having from 0.2 to 10 percent of said poly alkyl methacrylate.

References Cited in the file of this patent

UNITED STATES PATENTS

| | | |
|---|---|---|
| 2,342,414 | Magill | Feb. 22, 1944 |
| 2,636,862 | Watson | Apr. 28, 1953 |

UNITED STATES PATENT OFFICE
CERTIFICATE OF CORRECTION

Patent No. 3,036,012                                             May 22, 1962

Douglas H. Moreton

It is hereby certified that error appears in the above numbered patent requiring correction and that the said Letters Patent should read as corrected below.

Column 2, line 15, for "axial-piston" read -- Axial-Piston --; line 65, for "Ma-" read -- Machine Tools (Machine Shop Series)" (1943), of the --; column 4, line 74, for "axial-piston pump" read -- Axial-Piston Pump --.

Signed and sealed this 3rd day of December 1963.

(SEAL)
Attest:
ERNEST W. SWIDER

Attesting Officer

EDWIN L. REYNOLDS

Acting Commissioner of Patents